(12) United States Patent
Mercier

(10) Patent No.: US 10,935,357 B2
(45) Date of Patent: Mar. 2, 2021

(54) PROXIMITY FUSE HAVING AN E-FIELD SENSOR

(71) Applicant: BAE SYSTEMS INFORMATION AND ELECTRONIC SYSTEMS INTEGRATION INC., Nashua, NH (US)

(72) Inventor: Michael N. Mercier, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 198 days.

(21) Appl. No.: 15/962,002

(22) Filed: Apr. 25, 2018

(65) Prior Publication Data

US 2019/0331470 A1 Oct. 31, 2019

(51) Int. Cl.
*F42C 13/00* (2006.01)
*G01S 17/46* (2006.01)
*F42C 11/06* (2006.01)
*F42C 13/08* (2006.01)
*F42C 13/02* (2006.01)

(52) U.S. Cl.
CPC ............ *F42C 13/003* (2013.01); *F42C 11/06* (2013.01); *F42C 13/023* (2013.01); *F42C 13/08* (2013.01); *G01S 17/46* (2013.01)

(58) Field of Classification Search
CPC ........ F42C 13/00; F42C 13/003; F42C 19/12; F42C 13/08; F42C 13/023; F42C 11/06; G01S 17/46

USPC .................................................. 102/211, 214
See application file for complete search history.

(56) References Cited

U.S. PATENT DOCUMENTS

| 2,448,889 A | 9/1944 | Johnson et al. |
| 2,514,359 A | 7/1950 | Allison |
| 2,536,327 A | 1/1951 | Tolson |
| 2,727,140 A | 12/1955 | Bell |
| 2,995,089 A | 8/1961 | Custer et al. |
| 2,998,775 A | 9/1961 | Craft |
| 3,046,892 A | 7/1962 | Cosse et al. |
| 3,070,017 A | 12/1962 | Clark |
| 3,124,073 A | 3/1964 | Khouri et al. |
| 3,218,623 A * | 11/1965 | Buntenbach ............ F42C 13/00 340/561 |
| 3,308,760 A | 3/1967 | Peters |
| 3,332,077 A | 7/1967 | Nard et al. |
| 3,653,325 A | 4/1972 | Popper |
| 3,802,343 A | 4/1974 | Dahl |
| 3,839,963 A | 10/1974 | Nathan et al. |
| 3,871,296 A | 3/1975 | Heilprin et al. |
| 3,874,296 A | 4/1975 | Hedemark |

(Continued)

*Primary Examiner* — James S Bergin
(74) *Attorney, Agent, or Firm* — Sand, Sebolt & Wernow LPA; Scott J. Asmus

(57) ABSTRACT

A proximity fuse includes an electric-field (E-field) sensor to detect electrical disturbances from an object that is external and distinct from a device carrying the proximity fuse. The E-field sensor detects or senses E-fields versus time in order to provide omnidirectional coverage of the device carrying the proximity fuse. When the device carrying the fuse is a missile having warhead, the proximity fuse is connected with detonation logic that detonates the warhead at a desired time to destroy or neutralize the object, which is typically a threat, such as another missile.

6 Claims, 3 Drawing Sheets

(56) References Cited

U.S. PATENT DOCUMENTS

| | | | |
|---|---|---|---|
| 3,882,781 A * | 5/1975 | Krupen | F42C 13/00 |
| | | | 102/211 |
| 3,905,298 A | 9/1975 | Rehbock | |
| 3,908,551 A | 9/1975 | Dahl | |
| 3,934,510 A | 1/1976 | Dahl | |
| 3,945,008 A | 3/1976 | Schmucker | |
| 3,955,507 A | 5/1976 | Ziemba | |
| 4,056,061 A | 11/1977 | Becklund | |
| 4,183,303 A * | 1/1980 | Krupen | F42C 13/003 |
| | | | 102/211 |
| 4,185,559 A * | 1/1980 | Little | F42C 13/04 |
| | | | 102/211 |
| 4,190,000 A | 2/1980 | Shaull et al. | |
| 4,232,609 A | 11/1980 | Held | |
| 4,503,775 A | 3/1985 | Thordarson | |
| 4,641,801 A | 2/1987 | Lynch, Jr. et al. | |
| 4,726,291 A | 2/1988 | Lefranc | |
| 4,896,031 A | 1/1990 | Pettersson et al. | |
| 4,903,602 A | 2/1990 | Skagerlund | |
| 4,968,980 A | 11/1990 | Schmucker | |
| 4,972,775 A * | 11/1990 | Hoyt | F42C 13/003 |
| | | | 102/211 |
| 4,973,967 A | 11/1990 | David et al. | |
| 4,991,508 A * | 2/1991 | Ziemba | F42C 13/04 |
| | | | 102/211 |
| 5,277,114 A | 1/1994 | Witt | |
| 5,322,017 A | 6/1994 | Witt et al. | |
| 5,423,262 A | 6/1995 | Pettersson et al. | |
| 5,601,024 A | 2/1997 | Sepp et al. | |
| 5,796,029 A | 8/1998 | Held et al. | |
| 6,094,054 A * | 7/2000 | Crist | F42C 13/003 |
| | | | 324/452 |
| 7,765,083 B2 * | 7/2010 | Zank | G01S 5/00 |
| | | | 702/150 |
| 2015/0091748 A1 | 4/2015 | Conti et al. | |

* cited by examiner

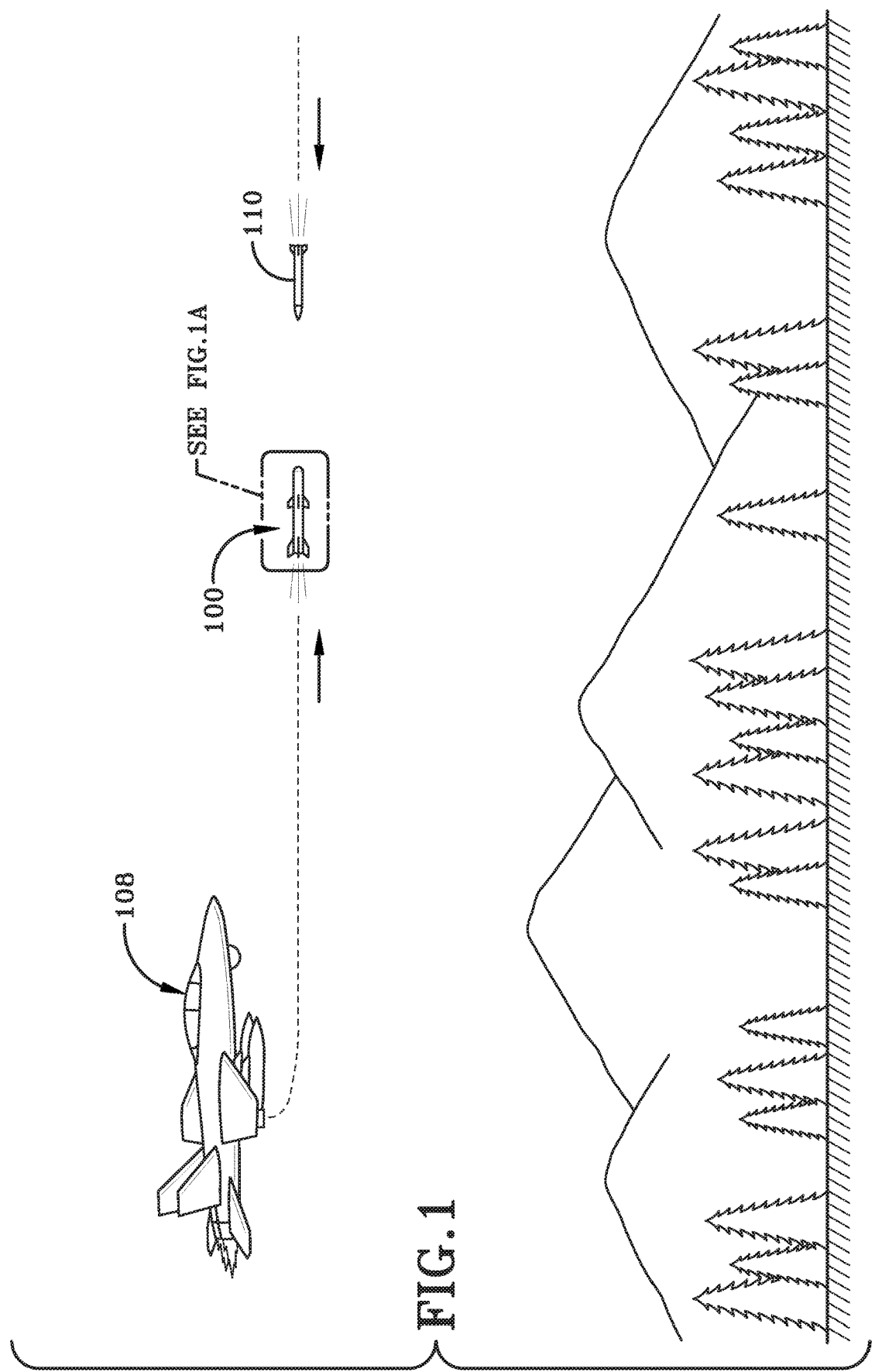

PROXIMITY FUSE HAVING AN E-FIELD SENSOR

BACKGROUND

Technical Field

The present disclosure relates generally to a proximity fuse having an sensor to detect electrical disturbances from an object that is external and distinct from a device carrying the proximity fuse. The sensor detects or senses E-fields versus time in order to provide omnidirectional coverage of the device carrying the proximity fuse. When the device carrying the fuse is a missile having warhead, the proximity fuse is connected with detonation logic that detonates the warhead at a desired time to destroy or neutralize the object, which is typically a threat, such as another missile.

Background Information

A proximity fuse (or fuze) is a fuse that detonates an explosive device automatically when the distance to the target becomes smaller than a predetermined value. Proximity fuses are designed for targets such as planes, missiles, ships at sea and ground forces. Some proximity fuses utilize lasers to detect infrared (IR) reflections of the target. Other proximity fuses utilize radio frequency sensing, radar sensing, other optical sensing, acoustic sensing, magnetic sensing, or pressure sensing to send a detonation signal to trigger an explosion or detonation of the warhead.

Changes in the electric-field (E-Field) are often unintended and unavoidable electrostatic emissions in the spectrum from sub 1 Hz to greater than 1 MHz. E-field distortions are caused by the spatial imbalance of electric charges. The electric field distortions in one instance are the result of a charge imbalance while others result from the distortion of the natural atmospheric potential gradient. Examples of E-field distortions include high voltage power lines, plasma from muzzle blasts, bullets in flight, rocket exhausts, jet afterburners. Further examples of E-field distortions include the surface friction on some materials such as plastics, helicopter rotors, and certain aerosols. Even animals and objects that are moving cause detectable distortions. For example, humans afford sufficient conductivity to measurably distort the isopotential lines of the proximate E-field as they move.

Unlike visual, infra-red, audio, and other spectra detected using prior art sensors, there has been far less research in the measurement and use of E-fields. There are also no known or readily apparent masking or countermeasure techniques or devices available for masking or concealing E-field distortions or for frustrating sensor detection of E-field distortions. As a result, the E-field sensing and processing makes practical use of spectrum that is virtually unexploited by the prior art.

There are many existing security and defense systems used for detection and identification of persons and objects, whether on the ground, underground or air-borne. Such systems are utilized whether for military applications or simple home security. The cost, complexity and installation difficulties of state of the art detection schemes make commercial implementation expensive and difficult.

With respect to military applications, the success of existing indication and warning (I&W) sensors and related intelligence detection and collection systems are being met with increasingly sophisticated countermeasures and conscientious efforts by opposing forces on concealment and location of sensitive facilities in highly cluttered areas. Further, many critical applications in which existing multi-spectral sensors are used are also susceptible to harmful interference, jamming, and other countermeasures. For example, photographic sensors can be frustrated by deliberate concealment and weather; electromagnetic sensors by masking, jamming, and clutter; and infrared sensors by shielding and decoys.

There are numerous papers and articles that discuss some electric field sensing devices. The prior art describes simple circuits with wire antennas and a field effect transistor (FET) that perform hobbyist experiments such as detecting static electricity from combing hair and static charge created by walking across a carpet. These devices are noted as being extremely sensitive and detect all types of charges.

There are prior art references relating to electric field sensors. For example, U.S. Pat. No. 6,922,059 provides an E-field detector system including at least one E-field distortion sensor that can detect distortion of the E-field by a person, vehicle, weapon, or electric power source. The e-field detector system compensates for background noise in the E-field by using coherent signal processing to isolate the detected source from the background noise and thus enable correlation of the distortion source with its electrostatic signature. It is low cost, passive, low power, long life, and extremely small. The detection spectrum includes the E field from sub 1 Hz to greater than 1 MHz.

E-field sensors and systems according to U.S. Pat. No. 6,922,059 exploit unintended and unavoidable electrostatic emissions in the spectrum from sub 1 Hz to greater than 1 MHz. For example, humans afford sufficient conductivity to measurably distort the isopotential lines of the proximate E-field. The system masks or conceals E-field distortions or for frustrating sensor detection of E-field distortions. Another embodiment of U.S. Pat. No. 6,922,059 detects E-field distortions caused by the spatial imbalance of ions, the presence of static generators, objects in contact with the ground that distort the existing E-field, and high voltage sources.

Not only do the devices detect motion of persons or objects, but they also provide detection of plasma from muzzle blasts, rocket exhausts, jet afterburners, helicopter rotors, and power generation/distribution systems. Thus the E-field sensors can detect and alert personnel to various threats.

Furthermore, U.S. Pat. No. 7,765,083 exploits e-fields to detect a projectile with an array of E-field sensors is used that senses the disturbance of the local E-field as the projectile approaches the sensor array. The output of each of the array sensors is processed to determine the zero crossing of the first partial derivative, −dE/dT, of the E-field sensor output voltage which marks the peak of the change in the E-field as the projectile comes into the closest proximity to the sensor. Pairs of sensors provide time-difference-of-arrival measurements based on the times associated with the passage of the projectile at a first and second E-field sensor in an array. An arc-2 tangent algorithm develops the azimuth or bearing to the source of the projectile when a two-dimensional E-field sensor array is used; or if a three-dimensional array is used, the elevation of the trajectory.

When a countermeasure system fires a missile (i.e., a countermeasure missile) from a platform towards an incoming threat, such as another missile (i.e., a threat missile), the countermeasure missile has difficulties tracking the threat missile. As a result, laser based proximity fuses are used for warhead detonation. The laser based proximity fuses tend not do have complete coverage in all directions and have relatively low reliability against small targets. For example, when a threat missile is attacking an aircraft, the laser based proximity fuses may be sufficient to identify when the threat missile should detonate to destroy the aircraft. However, for a countermeasure missile that is fired or deployed in response to the threat missile attacking the aircraft, the laser based proximity fuse is insufficient inasmuch as the coverage is incomplete and the threat missile is a small fast object.

SUMMARY

Issues continue to exist with countermeasure systems that need to rapidly detect incoming threats. More particularly, countermeasure missile fired from a platform need to be properly detonated at a correct time in order to destroy the threat. The present disclosure addresses these and other issue by providing an E-field based proximity fuse coupled with a warhead to detonate the same with an improved accuracy. The E-field proximity fuse detect the electrical charge carried by the target, such as an incoming threat missile (or helicopter rotor blades, or ionized gas, or any other electrical charge from an enemy). The fuse determines an optimal detonation point of the warhead on the countermeasure missile based on the detected electrical charge. In accordance with one aspect of the present disclosure, the E-field proximity fuse is omnidirectional and completely covers the device carrying the fuse.

In one aspect, an exemplary embodiment of the present disclosure may provide a proximity fuse comprising: an electric-field (E-field) sensor to sense an E-fields of an object near the E-field sensor; a detonation time calculator in electrical communication with the E-field sensor that sends a signal to detonate a warhead in response the E-field sensor sensing the E-field of the object; and detonation logic to detonate the warhead based, at least in part, on the E-field of the object. This embodiment or another embodiment may further provide a velocity calculator to determine velocity of the warhead; and a comparator that compares electrical signals from the E-field sensor and the velocity of the warhead, and the comparator electrically connected with the detonation time calculator to determine when to detonate the warhead based on the E-fields of the object. This embodiment or another embodiment may further provide an impact time calculator that receives signals from the comparator and determines a time to impact and sends the time to impact to the detonation time calculator. This embodiment or another embodiment may further provide an antenna; and a guard area proximate the antenna to reduce capacitance thereof. This embodiment or another embodiment may further provide wherein the E-field sensor further includes a differential amplifier with bootstrapping to provide high impedance for the antenna. This embodiment or another embodiment may further provide wherein the E-field sensor further includes a frequency filter to isolate E-field signals from the object. This embodiment or another embodiment may further provide wherein the E-field sensor further includes a buffer amplifier to provide high input impedance to the filter frequency filter while providing additional gain and a low impedance source for a voltage measuring device.

In another aspect, an exemplary embodiment may provider a countermeasure system for a platform, such as an aircraft or aerial vehicle regardless of whether manned or unmanned, the countermeasure system comprising: a plurality of sensors on the platform to detect an incoming threat wherein the incoming threat generates an E-field; a warhead that is deployable from the platform in response to the plurality of sensors detecting the incoming threat; and a proximity fuse electrically coupled to the warhead, wherein the proximity fuse includes an E-field sensor configured to sense the E-field of the incoming threat versus time to detonate the warhead, via detonation logic, based on the E-field of the incoming threat. This embodiment or another embodiment may further provide an antenna; and a guard area proximate the antenna to reduce capacitance thereof. This embodiment or another embodiment may further provide wherein the E-field sensor further includes a differential amplifier with bootstrapping to provide high impedance for the antenna. This embodiment or another embodiment may further provide wherein the E-field sensor further includes a frequency filter to isolate E-field signals from the object. This embodiment or another embodiment may further provide wherein the E-field sensor further includes a buffer amplifier to provide high input impedance to the filter frequency filter while providing additional gain and a low impedance source for a voltage measuring device.

In yet another aspect, an exemplary embodiment of the present disclosure may provide a missile comprising: a guidance system; a warhead that is deployable from the platform in response to the plurality of sensors detecting the incoming threat; and a proximity fuse electrically coupled to the warhead, wherein the proximity fuse includes an E-field sensor configured to sense the E-field of the incoming threat versus time to detonate the warhead, via detonation logic, based on the E-field of the incoming threat. This embodiment or another embodiment may further provide a front end of the countermeasure missile; wherein the proximity sensor is position forward towards the front end from the warhead.

In yet another aspect, an exemplary embodiment of the present disclosure may provide a method comprising: deploying a countermeasure munition in response to detection of a threat object; sensing an electric field (E-field) of the threat object with an E-field sensor integrated into a proximity fuse on the countermeasure munition; and detonating the countermeasure munition to eliminate or neutralize the threat object in response a determination, by the E-field sensor, of the E-field of the threat object versus time. This embodiment or another embodiment may further provide detecting E-field distortions with an antenna in the E-field sensor; reducing capacitance of the antenna with a guard area proximate the antenna and thereby increasing impedance in the antenna; processing and filtering, via a filter, unwanted signals from the detected E-field distortions; amplifying the detected E-field distortions with a differential amplifier; rejecting E-field distortions that are outside a filter range pre-selected to that of the threat object; and providing a high input impedance to the filter with a buffer amplifier.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

FIG. 1 is a schematic view of a platform with a countermeasure system deploying a warhead and coupled proximity fuse to eliminate an incoming threat.

DETAILED DESCRIPTION

Figure 1A:
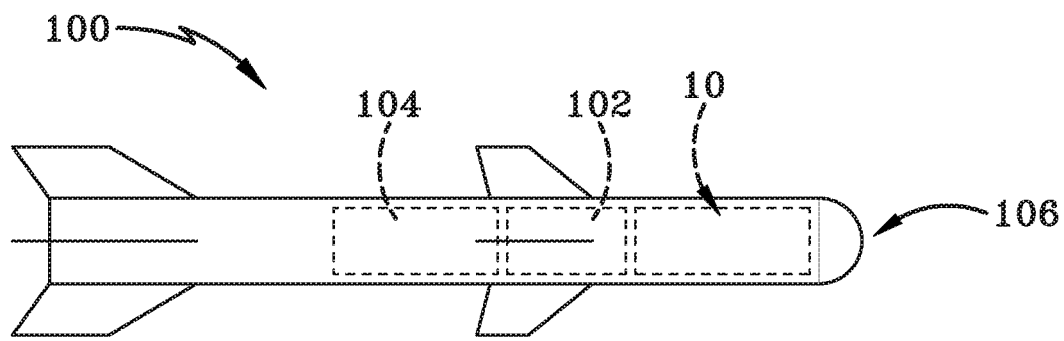
FIG. 1A is an enlarged schematic view of a countermeasure missile having the proximity fuse with a E-field sensor in the region labeled "SEE FIG. 1A" in FIG. 1 of a missile.

FIG. 1 and FIG. 1A are a schematic views of a countermeasure system including a plurality of sensors to detect an incoming threat that generates an electric field (E-field). The countermeasure system is configured to deploy a countermeasure missile 100 having an E-field proximity fuse 10 coupled with a warhead 102 and a guidance system 104. The E-field proximity fuse 10 may be positioned near the nose or front end 106 of the missile 100. The countermeasure missile is fired or deployed from a platform 108, such as an aerial vehicle, in response to an incoming threat missile 110 that was detected by a countermeasure system on the platform 108. The body of the incoming threat missile 110 generates an electric charge. The motor of the missile 110 generates ionized gases in flight. Each of the electric charge and the ionized gases of the missile 110 are detected by an e-field sensor 12 in the proximity fuse 10. The E-field sensor 12 measures the change in the e-field versus time.

Figure 2:
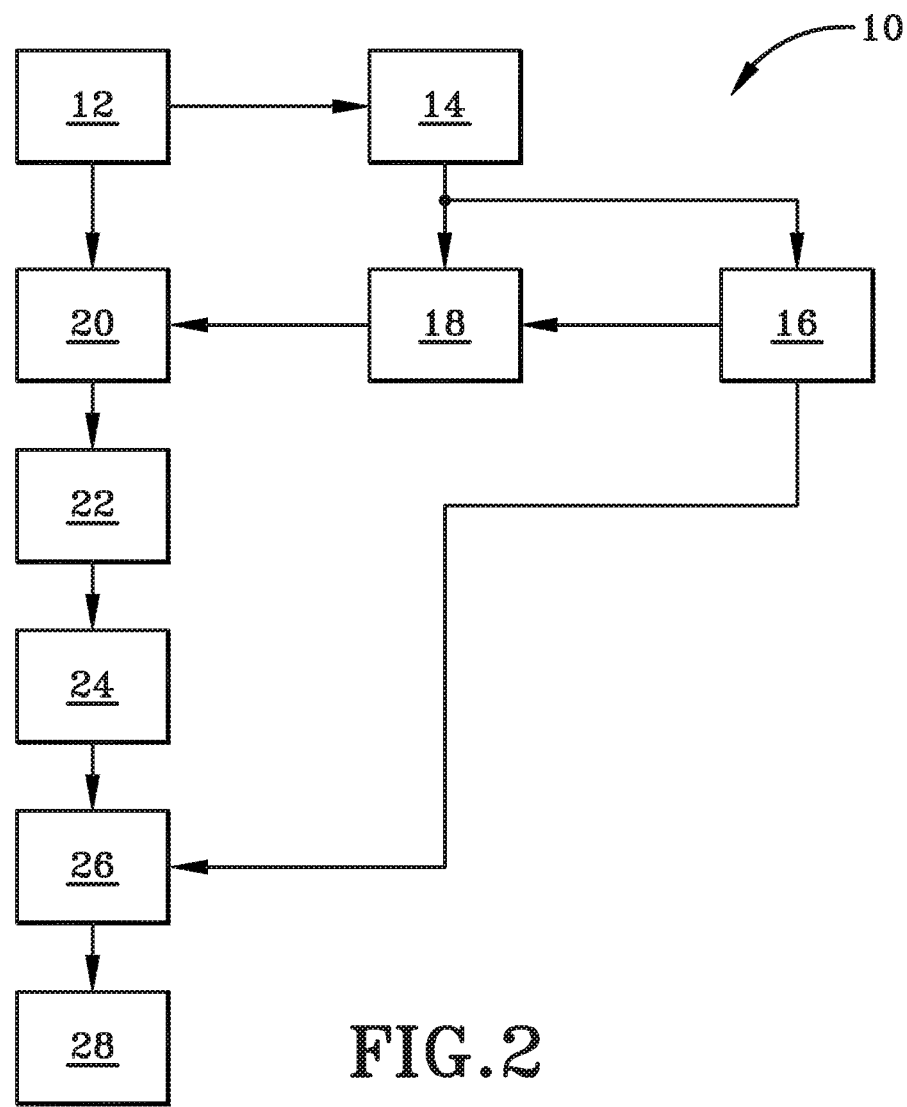
FIG. 2 is a schematic view of the proximity fuse with the E-field sensor.

FIG. 2 depicts a schematic design of the E-field proximity fuse generally at 10. The E-field proximity fuse 10 includes the e-field sensor 12, a timer 14, a distance calculator 16, a velocity calculator 18, a comparator 20, an impact time calculator 22, a detonation time calculator 24, detonation logic 26, and warhead detonation 28.

The e-field sensor 12 includes output signals that are coupled with the timer 14 and the comparator 20. The timer 14 receives the electrical signals from the e-field sensor 12. The timer 14 includes output signals that may be provide to the distance calculator or the velocity calculator 18. The distance calculator determines the distance between the missile or warhead and its target (i.e., the threat missile 110). The velocity calculator determines the velocity of the warhead or missile 100 carrying the proximity fuse 10. The velocity calculator 18 includes output signals connected to the comparator 20. The output of the comparator 20 is connected to the impact time calculator 22. The output of the impact time calculator 22 is connected the detonation time calculator 24. The detonation time calculator is connected to the detonation logic 26 which is configured to effectuate warhead detonation 28.

In operation, and with reference to FIG. 2, the timer 14 begins when the e-field sensor 12 detects a sufficient change in the e-field of the threat missile 110 versus time as the countermeasure missile 100 approaches the threat missile 110. The distance calculator 16 determines the distance between the missile 100 and the missile 110. Timing may be carried out at a cycle frequency of, e.g., 1 msec. The velocity calculator 18 determines the velocity of the missile 100 ($V_{FL}$) from the change in the distance from one or more distances determined one after another at the known time difference.

The velocity $V_{FL}$ may not be needed, if it is already known. It might be designed to be relatively constant due to the cruise engine of the missile 110, or the velocity curve is relatively more or less given as a function of the flight time. This value can also be preset in this case by a velocity preset value as a function of the time, triggered with the start time of the missile 100 as the zero point. It may be possible to eliminate the calculation of $V_{FL}$, or this preset value is used for the continuous comparison and compensation of the measurements in a comparator 40. If the measured or calculated flight velocity $V_{FL}$ is in the range of the "possible" velocity, the measured value is subjected to further processing, namely it is supplied at 36 to calculate $T_F$ (time to impact). If, for whatever reason, it is outside this range, the "preprogrammed" value of $V_{FL}$ 30 is supplied at 36 and is used to calculate $T_F$ (time to impact) for the further processing.

The time $T_F$ until the direct impact at the target can now be calculated at 32 by means of the approach velocity of the missile and the distance between the missile 100 and the missile 110.

The desired activation/ignition time $T_z$ can also be calculated with the missile 100 velocity, with the missile having to be detonated or the ejection mechanism having to the triggered at a distance A before, at, or after the target. The activation/ignition time $T_z$ is calculated from: $T_z = A/V_{FL}$.

The time difference $T_z$ (or $\Delta T$) until the activation/ignition can now be determined at 34 in a "countdown" with: $T_D = T_F - T_z$; wherein $T_D$ value must become 0. When $T_D = 0$, as determined at 34, the activation/ignition of the warhead is initiated at 28, via logic element 26, unless the activation/ignition of the warhead was triggered before by the distance meter when the desired distance A was reached. In practice, the "distance sensor" is presumably given preference over the "time sensor," i.e., the critical distance A for the distance measurement is kept somewhat greater than the distance A that is preset for the time measurement. This circuit has the advantage that, should a disturbance occur in the sensor during the terminal phase, the time sensor will still initiate, at the correct distance toward the target, the function of the warhead 102, i.e., the ejection of the pre-hollow charge or the detonation of the pre-hollow charge with a corresponding time delay of the main hollow charge in the case of tandem systems, etc.

Figure 3:
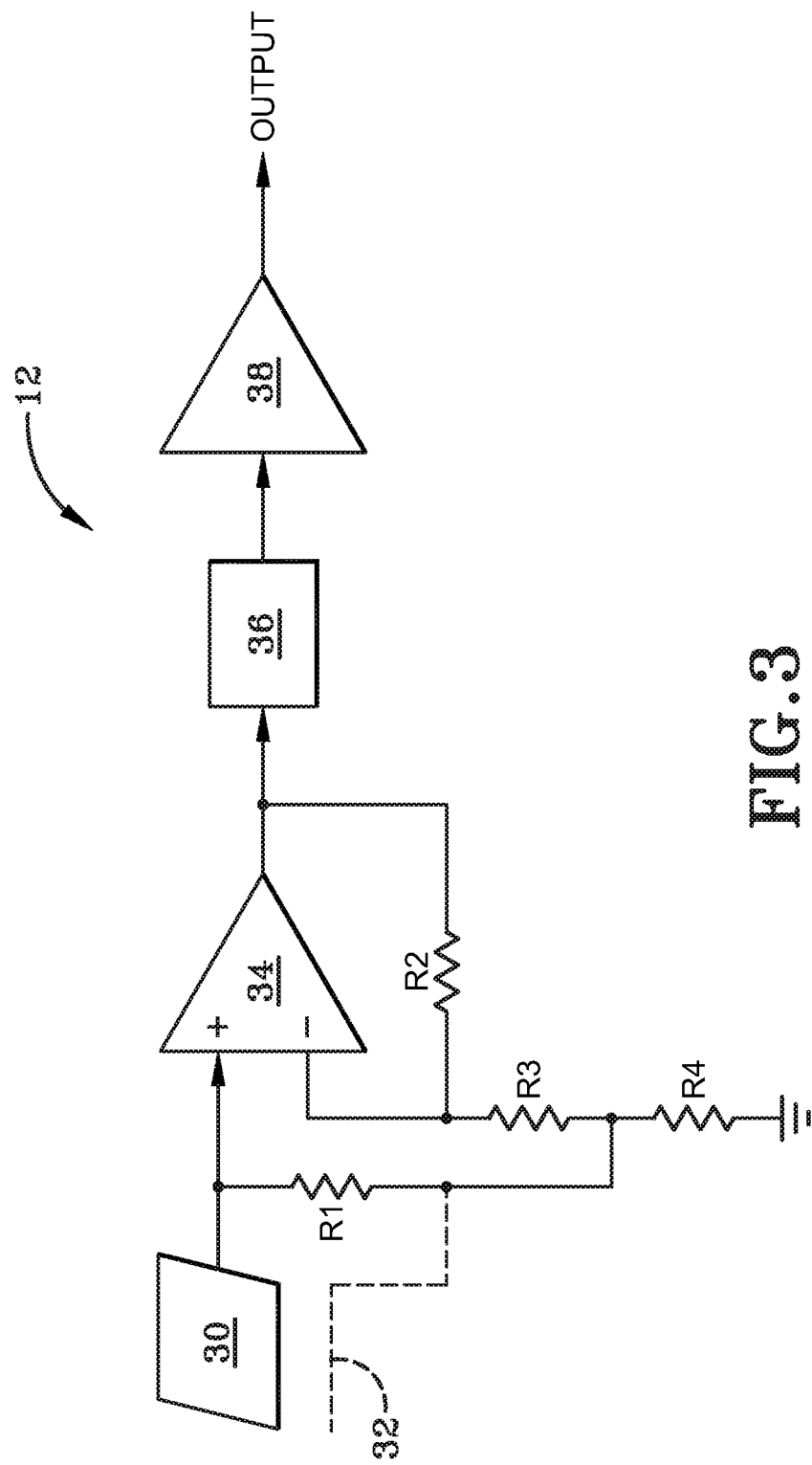
FIG. 3 is a schematic view of the E-field sensor.

FIG. 3 is a block diagram representing a simple embodiment of the e-field sensor 12 for detecting E-field distortions illustrating the circuit arrangement as well as the interconnection of the inputs and outputs. The sensing area 30 or "antenna" is generally a small receptive element, and in a particular embodiment the sensing area 30 is a printed wiring board (PWB) etch or pad although it could also be an external sphere or other receptive unit.

The sensor area 30 in FIG. 3 can essentially be regarded as one side of a capacitor with the other side being the charged source or even the earth's field being the source. The larger the area the greater the sensitivity, however interference and extraneous signals become problematic if the reception is too high. In one embodiment the pad is approximately 1/30 inch and picks up signals as low as 200 millivolts. Other sensing areas from about 1/10 of a square inch to several inches results in different data measurements and the size of the antenna depends upon the application and environmental conditions.

There is a guard area 32 proximate the sensing element which functions to reduce the 'capacitance'. In one embodiment where the circuit is laid out on a printed circuit board, the guard area is a wiring board etch on the opposite side of printed circuit board opposing the sensing area 30. The guard 32 primarily eliminates the capacitance of the shield, such as coax cable, thereby greatly increasing the antenna 30 impedance. The sensing area 30 does not need to be a large area sensing element, inasmuch as large sensing elements might pick up too many extraneous signals to be useful. In one embodiment the sensing element 30 is designed for maximum input impedance with a partial Faraday shield (not shield) covering a portion of the sensing area 30 to reduce the gain.

Thus, the size of the sensor area 30 is one method to adjust system gain, while another adjustment mechanism is the shielding. Subsequent signal processing and filtering is used to reject unwanted signals, for example, narrow pulses or relatively high frequency signals such as those caused by lightening, arc welders, and RF sources are rejected. It should be noted that a typical signal response in the range of 0.1-5 kHz does not have any DC bias.

The differential amplifier 34 is used with bootstrapping to establish high impedance and provide amplification. The gain of the differential amplifier 34 is determined by the resistors R2, R3, and R4 and as is well known in the art, that the gain is equal to (R2+R3+R4)/(R3+R4). The resistors R3 and R4 determine the percentage of input signal that is coupled to one side of R1 and the guard 32. For example, R3=1 k and R4=9 k, the voltage at the junction of R3 and R4 is 90% of the voltage at the sensing area 30. In effect, R1 appears ten times larger, and the capacitance of the sensing area 30 to be ten times lower.

Expressed differently, if the voltage at the junction were 99.9% of that present at the sensing area 30, the R3 would appear 1000 times larger and the capacitance of the sensing area 30 would appear to be 1000 times smaller. Thus the ratio of R3 to R4 determines the input resistance to the amplifier 34. One particular embodiment of sensor 12 may make the input impedance very high without having amplifier 34 saturate due to its input bias currents. Typical feedback ratios are from 90% to 99% while the value of R1 might be 10 Mohms, giving an effective input resistance of 100 to 1000 Mohms or more.

In another particular embodiment, the differential amplifier 34 is a field-effect operational amplifier with bootstrapping to provide high impedance for the sensing element 30. In this circuit, the sensing element 30 is a small metallic piece that is part of the printed wiring board, such as an etch on the board. The sensing element signal is amplified and converted to a low source impedance. R1 is 10 Mohm, R2 is 6.04 Kohm, R3 is 33.2 ohm and R4 is 301 ohm. An additional resistor R5 may be connected between the sensing area 30 and the positive (+) input of the differential amplifier 34 of approximately 10 Kohm to provide amplifier protection.

A frequency filter 36 is used to isolate the signals of interest. For example, if looking for e-fields of an incoming missile threat, the filter 36 may be used to reject the E-field caused by electrical devices or other objects outside that of the incoming threat. Accordingly, the filter 36 may be a bandpass filter. Other filters may also be used depending upon the operating environment, such as differing noise parameters. Those skilled in the art are familiar with the appropriate resistor and capacitor arrangement necessary to produce the notch filter 36. Other filters include other bandpass, highpass and lowpass filters that are used in certain circumstances.

The buffer amplifier 38 provides high input impedance to the filter 36 while providing additional gain and a low impedance source for the voltage measuring device. Typically the measuring device is a sample-and-hold circuit followed by an analog-to-digital (A/D) converter and subsequent processing circuitry.

The buffer amplifier stage 38 in one embodiment is a second field-effect operational amplifier and is shown with unity gain but could be used to achieve an approximate gain of 20 dB. A 15 v DC power is supplied by a power source, such as common dry cell batteries, although any power source with acceptable output may be used. The output signal of the sensor device is delivered to the next stage of the detection system.

The sensor does not require unique components and persons skilled in the art will choose components that will enable optimal configuration to achieve the objectives of the sensor's application. The combination of the sensing elements and guard in conjunction with the bootstrapped differential amplifier and other elements enables the unexpected sensing of electric field disturbances in a wide array of applications.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

For example, the E-field sensor 12 could be incorporated into other systems or other sensing applications, such as a variety of automotive applications or other aerial applications. The E-field sensor 12 could be coupled with a variety of other sensors such as Radar, Lidar, and acoustic sensors, and the like to generate a holistic multi-mode sensing approach. In one particular embodiment, the multi-mode sensing approach incorporating the E-field sensor 12 could be utilized to detect collisions between objects. When applied to missile 100, the E-field sensor 12 could be incorporated into a guidance system to help steer or guide the countermeasure missile 100 towards the threat missile 110. However, this guidance aspect of the sensor 12 could have more common applications. For example, with the advent of electric vehicles, the sensor 12 could be integrated into a guidance system for electric cars, such as those manufactured by Tesla, Inc. of Palo Alto, Calif., and the like. Electric cars are known to produce E-fields, and the sensor 12 could be integrated into a first vehicle in order to sense other objects or other vehicles around the first vehicle. The sensor data output could be populated and provided to guidance logic or collision detection logic carried by the first vehicle. The logics in the first vehicle could process the E-filed data of the objects surround the vehicle to ensure that the vehicle is maintained at a safe location to prevent injury to the passengers inside the vehicles as well as other persons external to the first vehicle. The sensor 12 may still measure E-field versus time together with other distance sensors on the first vehicle to ensure a time to collision is determined so that the first vehicle may be stopped so that no collision occurs. Thus, the sensor 12 could be integrated as part of a vehicle guidance system or a collision avoidance system or as part of the autonomous drive systems of an electric vehicle.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A proximity fuse comprising:
   an electric-field (E-field) sensor to sense at least one E-field of an object near the E-field sensor;
   a detonation time calculator in electrical communication with the E-field sensor for sending a signal to detonate a warhead in response the E-field sensor sensing the at least one E-field of the object;
   detonation logic to detonate the warhead based, at least in part, on the at least one E-field of the object;
   a velocity calculator to determine a velocity of the warhead; and
   a comparator that compares electrical signals from the E-field sensor and the velocity of the warhead, wherein the comparator is electrically connected with the detonation time calculator in order to determine when to detonate the warhead based on the at least one E-field of the object.

2. The proximity fuse of claim 1, further comprising:
   an impact time calculator that receives signals from the comparator and determines a time to impact and sends the time to impact to the detonation time calculator.

3. The proximity fuse of claim 1, wherein the E-field sensor includes:
   an antenna; and
   a guard area proximate the antenna to reduce capacitance thereof.

4. The proximity fuse of claim 3, wherein the E-field sensor further includes a differential amplifier with bootstrapping to provide high impedance for the antenna.

5. The proximity fuse of claim 4, wherein the E-field sensor further includes a frequency filter to isolate at least one-E-field signal from the object.

6. The proximity fuse of claim 5, wherein the E-field sensor further includes a buffer amplifier to provide high input impedance to the frequency filter while providing additional gain and a low impedance source for a voltage measuring device.

\* \* \* \* \*